United States Patent
Lee

(10) Patent No.: US 10,356,724 B2
(45) Date of Patent: Jul. 16, 2019

(54) DEVICE HANDLING POWER CONTROL FOR TIME INTERVALS BASED ON POWER LEVEL LIMIT

(71) Applicant: ACER INCORPORATED, New Taipei (TW)

(72) Inventor: Chien-Min Lee, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/659,636

(22) Filed: Jul. 26, 2017

(65) Prior Publication Data
US 2018/0035385 A1 Feb. 1, 2018

Related U.S. Application Data

(60) Provisional application No. 62/368,188, filed on Jul. 29, 2016.

(51) Int. Cl.
*H04W 52/14* (2009.01)
*H04W 52/34* (2009.01)
(Continued)

(52) U.S. Cl.
CPC ........ *H04W 52/146* (2013.01); *H04B 7/2615* (2013.01); *H04W 52/325* (2013.01);
(Continued)

(58) Field of Classification Search
CPC . H04W 52/146; H04W 52/367; H04W 52/10; H04W 52/16; H04W 52/346;
(Continued)

(56) References Cited

U.S. PATENT DOCUMENTS

| 8,687,541 B2 | 4/2014 | Löhr |
| 8,737,333 B2 | 5/2014 | Chen |

(Continued)

FOREIGN PATENT DOCUMENTS

| CN | 102118787 A | 7/2011 |
| CN | 102893679 A | 1/2013 |

(Continued)

OTHER PUBLICATIONS

Media Tek, Per UE PHR for carrier aggregation, 3GPP TSG-RAN WG1 Meeting #61bis, R1-103743, Dresden, Germany, Jun. 28-Jul. 2, 2010.

(Continued)

*Primary Examiner* — Philip Sobutka
(74) *Attorney, Agent, or Firm* — Winston Hsu

(57) ABSTRACT

A communication device for handling power control for multiple time intervals comprises a storage device for storing instructions and a processing circuit coupled to the storage device. The processing circuit is configured to execute the instructions stored in the storage device. The instructions comprise determining a first power level for at least one first uplink (UL) transmission, a second power level for at least one second UL transmission and a third power level for at least one third UL transmission such that a sum of the first power level and the second power level is not greater than a power level limit of the communication device and a sum of the first power level and the at least one third power level is not greater than the power level limit.

25 Claims, 8 Drawing Sheets

(51) Int. Cl.
*H04W 52/36* (2009.01)
*H04B 7/26* (2006.01)
*H04W 52/32* (2009.01)
*H04W 52/40* (2009.01)
*H04W 24/02* (2009.01)
*H04W 52/54* (2009.01)
*H04W 92/20* (2009.01)

(52) U.S. Cl.
CPC ....... *H04W 52/346* (2013.01); *H04W 52/367* (2013.01); *H04W 52/40* (2013.01); *H04W 24/02* (2013.01); *H04W 52/54* (2013.01); *H04W 92/20* (2013.01)

(58) Field of Classification Search
CPC ..... H04W 52/08; H04W 52/18; H04W 52/34; H04W 72/0446; H04W 72/0473; H04W 52/343; H04W 52/04
USPC ........................................................ 455/522
See application file for complete search history.

(56) References Cited

U.S. PATENT DOCUMENTS

| | | |
|---|---|---|
| 2013/0070611 A1 | 3/2013 | Ahn |
| 2013/0324182 A1 | 12/2013 | Deng |
| 2014/0023010 A1 | 1/2014 | Loehr |
| 2014/0369324 A1* | 12/2014 | Lin ............... H04W 52/146 370/336 |
| 2015/0036668 A1 | 2/2015 | Kanamarlapudi | 
| 2015/0350944 A1 | 12/2015 | Chen |
| 2016/0081044 A1 | 3/2016 | Wang |
| 2016/0128095 A1 | 5/2016 | Damnjanovic |
| 2016/0198421 A1 | 7/2016 | Yi |
| 2016/0205631 A1 | 7/2016 | Chen |
| 2016/0255593 A1* | 9/2016 | Blankenship ....... H04W 52/146 370/328 |

FOREIGN PATENT DOCUMENTS

| | | |
|---|---|---|
| CN | 105519210 A | 4/2016 |
| EP | 3 001 720 A1 | 3/2016 |
| EP | 3 142 427 A1 | 3/2017 |
| EP | 3 169 117 A1 | 5/2017 |
| WO | 2015/041406 A1 | 3/2015 |
| WO | 2015/068039 A2 | 5/2015 |
| WO | 2015093768 A1 | 6/2015 |
| WO | 2015/141747 A1 | 9/2015 |
| WO | 2015139032 A1 | 9/2015 |
| WO | 2015170725 A1 | 11/2015 |
| WO | 2016006681 A1 | 1/2016 |
| WO | 2017/079530 A1 | 5/2017 |

OTHER PUBLICATIONS

Media Tek Inc., Views on per UE PHR, 3GPP TSG-RAN WG1 Meeting #62, R1-104545, Madrid, Spain, Aug. 23-27, 2010.
Huawei, Power Headroom Report Enhancement for CA, 3GPP TSG RAN WG1 meeting #62, R1-104493, Madrid, Spain, Aug. 23-27, 2010.

* cited by examiner

DEVICE HANDLING POWER CONTROL FOR TIME INTERVALS BASED ON POWER LEVEL LIMIT

CROSS REFERENCE TO RELATED APPLICATIONS

This application claims the benefit of U.S. Provisional Application No. 62/368,188 filed on Jul. 29, 2016, which is incorporated herein by reference.

BACKGROUND OF THE INVENTION

1. Field of the Invention

The present invention relates to a communication device and a method used in a wireless communication system, and more particularly, to a communication device and a method of handling power control for multiple time intervals in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc. For a UE and an eNB to communicate with each other in the LTE-A system, the UE and the eNB must support standards developed for the LTE-A system, such as the 3GPP Rel-1X standard or later versions.

A shortened transmission time interval (TTI) is proposed to improved transmission efficiency. However, the shortened TTI may coexist with a legacy TTI (i.e., normal TTI). That is, a UE may perform transmissions via both the shortened TTI and the legacy TTI. Power control in the art is developed only for the legacy TTI, and cannot be applied to TTIs with multiple types (e.g., lengths). Thus, how to handle the power control for the TTIs is an important problem to be solved.

SUMMARY OF THE INVENTION

The present invention therefore provides a method and related communication device for handling power control for multiple time intervals to solve the abovementioned problem.

A communication device for handling power control for multiple time intervals comprises a storage device for storing instructions and a processing circuit coupled to the storage device. The processing circuit is configured to execute the instructions stored in the storage device. The instructions comprise determining a first power level for a first uplink (UL) transmission, a second power level for a second UL transmission and at least one third power level for at least one third UL transmission such that a sum of the first power level and the second power level is not greater than a power level limit of the communication device and at least one corresponding sum of the first power level and the at least one third power level is not greater than the power level limit; performing the first UL transmission with the first power level in a first time interval to a network; performing the second UL transmission with the second power level in a second time interval in the first time interval to the network; and performing the at least one third UL transmission with the at least one third power level in at least one third time interval in the first time interval to the network, wherein the second time interval and the at least one third time interval are not overlapped.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
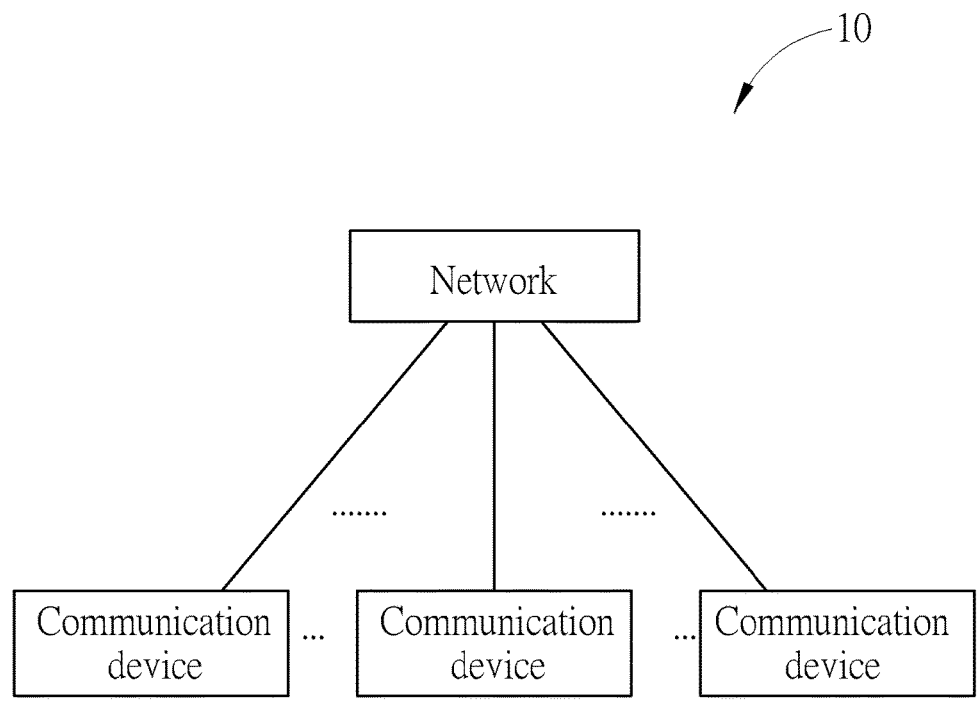
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In one example, the network may be an evolved UTRAN (E-UTRAN) including at least one evolved NB (eNB) and/or at least one relay node in a long term evolution (LTE) system, a LTE-Advanced (LTE-A) system, an evolution of the LTE-A system, etc. In one example, the network may be a next generation radio access network (NR-RAN) including at least one eNB and/or at least one next generation NB (gNB).

Furthermore, the network may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN/NG-RAN and decisions corresponding to the information are made at the UTRAN/E-UTRAN/NG-RAN. Alternatively, the UTRAN/E-UTRAN/NG-RAN may forward the information to the core network, and the decisions corresponding to the information are made at the core network after the core network processes the information. In addition, the information may be processed by both the UTRAN/E-UTRAN/NG-RAN and the core network, and the decisions are made after coordination and/or cooperation are performed by the UTRAN/E-UTRAN/NG-RAN and the core network.

A communication device may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
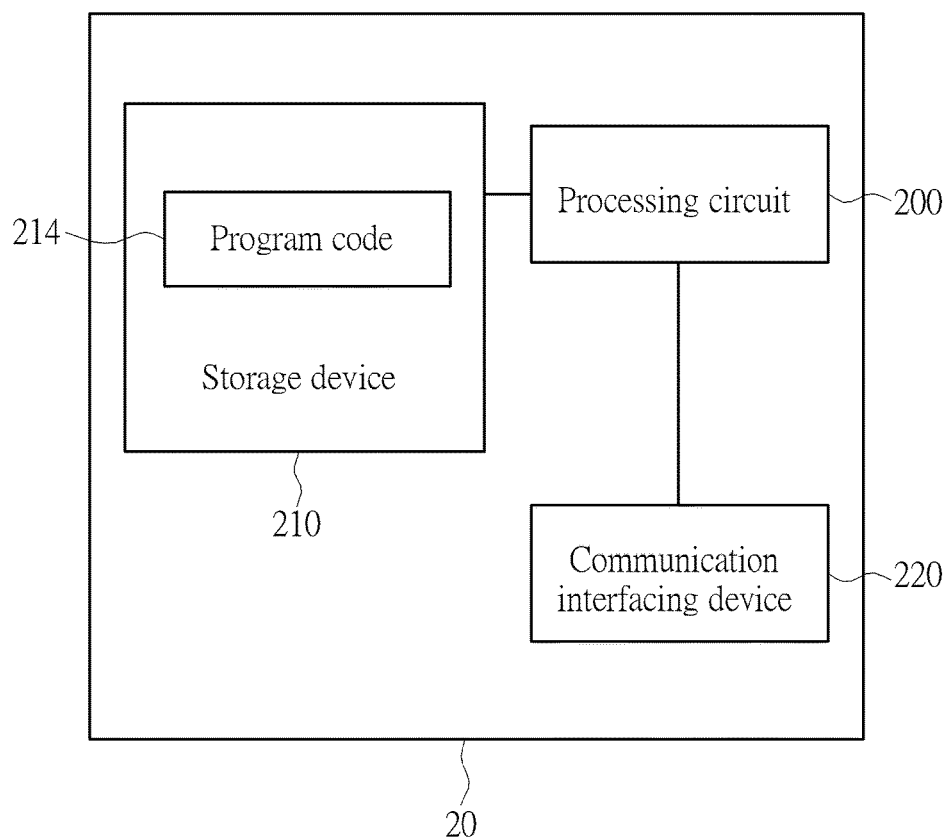
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The communication interfacing device 220 is preferably a transceiver and is used to transmit and receive signals (e.g., data, messages and/or packets) according to processing results of the processing circuit 200.

Figure 3:
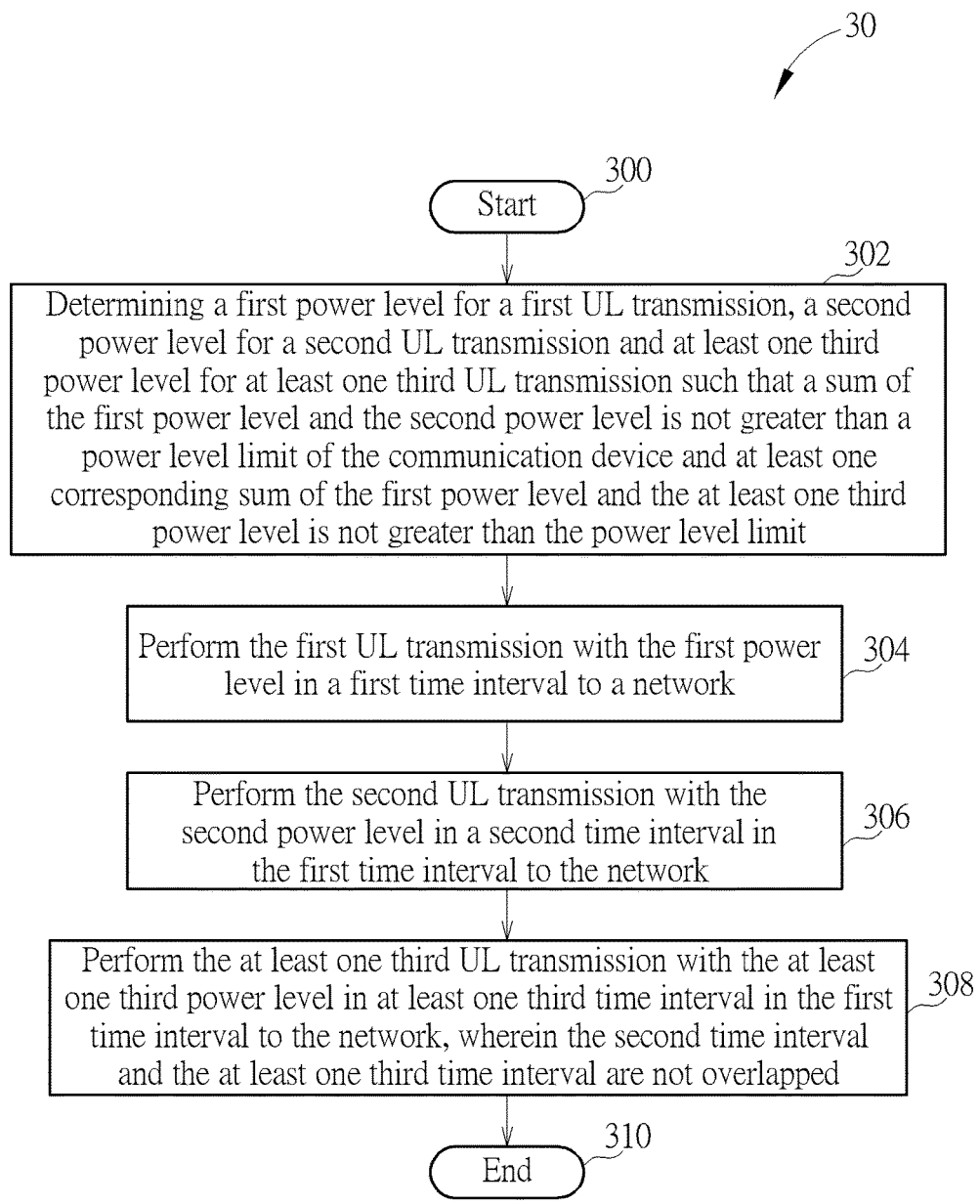
FIG. 3 is a flowchart of a process according to an example of the present invention.

FIG. 3 is a flowchart of a process 30 according to an example of the present invention. The process 30 may be utilized in a communication device shown in FIG. 1, to handle power control for multiple time intervals. The process 30 may be compiled into the program code 214 and includes the following steps:

Step 300: Start.

Step 302: Determining a first power level for a first UL transmission, a second power level for a second UL transmission and at least one third power level for at least one third UL transmission such that a sum of the first power level and the second power level is not greater than a power level limit of the communication device and at least one corresponding sum of the first power level and the at least one third power level is not greater than the power level limit.

Step 304: Perform the first UL transmission with the first power level in a first time interval to a network.

Step 306: Perform the second UL transmission with the second power level in a second time interval in the first time interval to the network.

Step 308: Perform the at least one third UL transmission with the at least one third power level in at least one third time interval in the first time interval to the network, wherein the second time interval and the at least one third time interval are not overlapped.

Step 310: End.

According to the process 30, the communication device determines a first power level for a first UL transmission, a second power level for a second UL transmission and at least one third power level for at least one third UL transmission such that a sum of the first power level and the second power level is not greater (i.e., equal or smaller than) than a power level limit of the communication device and at least one corresponding sum of the first power level and the at least one third power level is not greater than the power level limit. Then, the communication device performs (i.e., transmits) the first UL transmission with the first power level in a first time interval to a network. The communication device performs the second UL transmission with the second power level in a second time interval in the first time interval to the network. The communication device performs the at least one third UL transmission with the at least one third power level (e.g., respectively) in a third time interval in the first time interval to the network, wherein the second time interval and the at least one third time interval are not overlapped. In addition, each of the at least one third time interval is not overlapped with each other. That is, even though the second time interval and the at least one third time interval are shortened time intervals included in the first time interval (e.g., with a normal length), the power levels can still be determined such that a corresponding sum of the power levels at any time instant is not greater than the power level limit. Thus, the UL transmissions can be performed regularly without being dropped or lost.

It should be noted that "a first time interval in a second time interval" may mean that most part of the first time interval is in the second time interval due to timing alignment (e.g., system design) or timing error (e.g., delay and/or timing advance). That is, the present invention can be applied to cases of imperfect timing alignment.

Realization of the process 30 is not limited to the above description. The following examples may be applied for realizing the process 30.

Various ways may be used for determining the first power level, the second power level and the at least one third power level, and are illustrated as follows.

In one example, the communication device adjusts a first scheduled power level for the first UL transmission to the first power level and a second scheduled power level for the second UL transmission to the second power level according to the power level limit and a weight for the first scheduled power level and the second scheduled power level, wherein the second scheduled power level is greater than at least one third scheduled power level for the at least one third UL transmission. Then, the communication device adjusts the at least one third scheduled power level to the at least one third power level according to the power level limit and the first power level, if at least one corresponding sum of the first power level and the at least one third scheduled power level is greater than the power level limit.

In one example, the communication device adjusts a first scheduled power level for the first UL transmission to the first power level and a second scheduled power level for the second UL transmission to the second power level according to the power level limit and a number of scheduled UL transmissions for the second time interval and the at least one third time interval (and/or a number of scheduled UL transmissions for the first time interval), wherein the second scheduled power level is greater than at least one third scheduled power level for the at least one third UL transmission. Then, the communication device adjusts the at least one third scheduled power level to the at least one third power level according to the power level limit and the first power level, if at least one corresponding sum of the first power level and the at least one third scheduled power level is greater than the power level limit.

In one example, the communication device adjusts a first scheduled power level for the first UL transmission to the first power level and a second scheduled power level for the second UL transmission to the second power level according to the power level limit and a maximum number of schedulable UL transmissions for the second time interval and the at least one third time interval (and/or a maximum number of schedulable UL transmissions for the first time interval), wherein the second scheduled power level is greater than at least one third scheduled power level for the at least one third UL transmission. Then, the communication device adjusts the at least one third scheduled power level to the at least one third power level according to the power level limit and the first power level, if at least one corresponding sum of the first power level and the at least one third scheduled power level is greater than the power level limit.

In one example, the communication device adjusts a first scheduled power level for the first UL transmission to the first power level and a second scheduled power level for the second UL transmission to the second power level according to the power level limit, a length of the first time interval and a length of the second time interval, wherein the second scheduled power level is greater than at least one third scheduled power level for the at least one third UL transmission. Then, the communication device adjusts the at least one third scheduled power level to the at least one third power level according to the power level limit and the first power level, if at least one corresponding sum of the first power level and the at least one third scheduled power level is greater than the power level limit.

In one example, the communication device adjusts a first scheduled power level for the first UL transmission to the first power level according to the power level limit and a maximum of a second scheduled power level for the second UL transmission and at least one third scheduled power level for the at least one third UL transmission. Then, the communication device configures the second power level to be the second scheduled power level, and configures the at least one third power level to be the at least one third scheduled power level. Further, a length of the second time interval and a length of each of the at least one third time interval may or may not be shorter than a predetermined value (e.g., fixed value), or may be preconfigured in the communication device. A number of scheduled UL transmissions for the second time interval and the at least one third time interval may not be less than a predetermined value (e.g., fixed value), or may be preconfigured in the communication device.

In one example, the communication device configures the first power level to be a first scheduled power level for the first UL transmission. Then, the communication device adjusts a second scheduled power level for the second UL transmission to the second power level according to the power level limit and the first power level, and the communication device adjusts at least one third scheduled power level for the at least one third UL transmission to the at least one third power level according to the power level limit and the first power level. Further, a length of the second time interval and a length of each of the at least one third time interval may or may not be shorter than a predetermined value (e.g., fixed value), or may be preconfigured in the communication device. A number of scheduled UL transmissions for the second time interval and the at least one third time interval may be less than a predetermined value (e.g., fixed value), or may be preconfigured in the communication device.

In one example, the communication device adjusts at least one third scheduled power level for the at least one third UL transmission to the at least one third power level according to the power level limit and the first power level. In one example, at least one grant for the at least one third UL transmission is received, after a grant for the first UL transmission is received. In one example, the at least one third UL transmission is performed, after the first UL transmission is performed. In one example, at least one grant for the at least one third UL transmission is received, not earlier than that the first UL transmission is performed.

In one example, the second power level is approximately zero (or exactly zero), and performing the second UL transmission comprises dropping the second UL transmission. In one example, the at least one third power level is approximately zero (or exactly zero), and performing the at least one third UL transmission comprises dropping the at least one third UL transmission. In one example, the first power level is approximately zero (or exactly zero), and performing the first UL transmission comprises dropping the first UL transmission.

In one example, the first UL transmission is performed to a first serving cell of the network, and the second UL transmission and the at least one third UL transmission are performed to a second serving cell of the network. In one example, the first UL transmission is performed via a first radio access technology (RAT), and the second UL transmission and the at least one third UL transmission are performed via a second RAT. In one example, the second UL transmission comprises a physical UL shared channel (PUSCH), and the at least one third UL transmission comprises at least one physical UL control channel (PUCCH). In one example, the second UL transmission comprises a PUSCH, and the at least one third UL transmission comprises at least one PUSCH. In one example, the first UL transmission comprises a PUSCH, a PUCCH or a physical random access channel (PRACH).

In one example, the at least one third time interval is after the second time interval. In one example, a length of the second time interval and a length of each of the at least one third time interval are the same. In one example, a length of the second time interval and a length of each of the at least one third time interval are not greater than a half length of the first time interval.

It should be noted that lengths of the time intervals mentioned above are not limited. In one example, a length of the first time interval is 1 transmission time interval (TTI), a length of the second time interval is 0.5 TTI, and a length of the third time interval is 0.5 TTI. In another example, the lengths of the second time interval and the third time interval are different. A TTI may be 1 ms or 2 ms, but is not limited herein.

Figure 4:
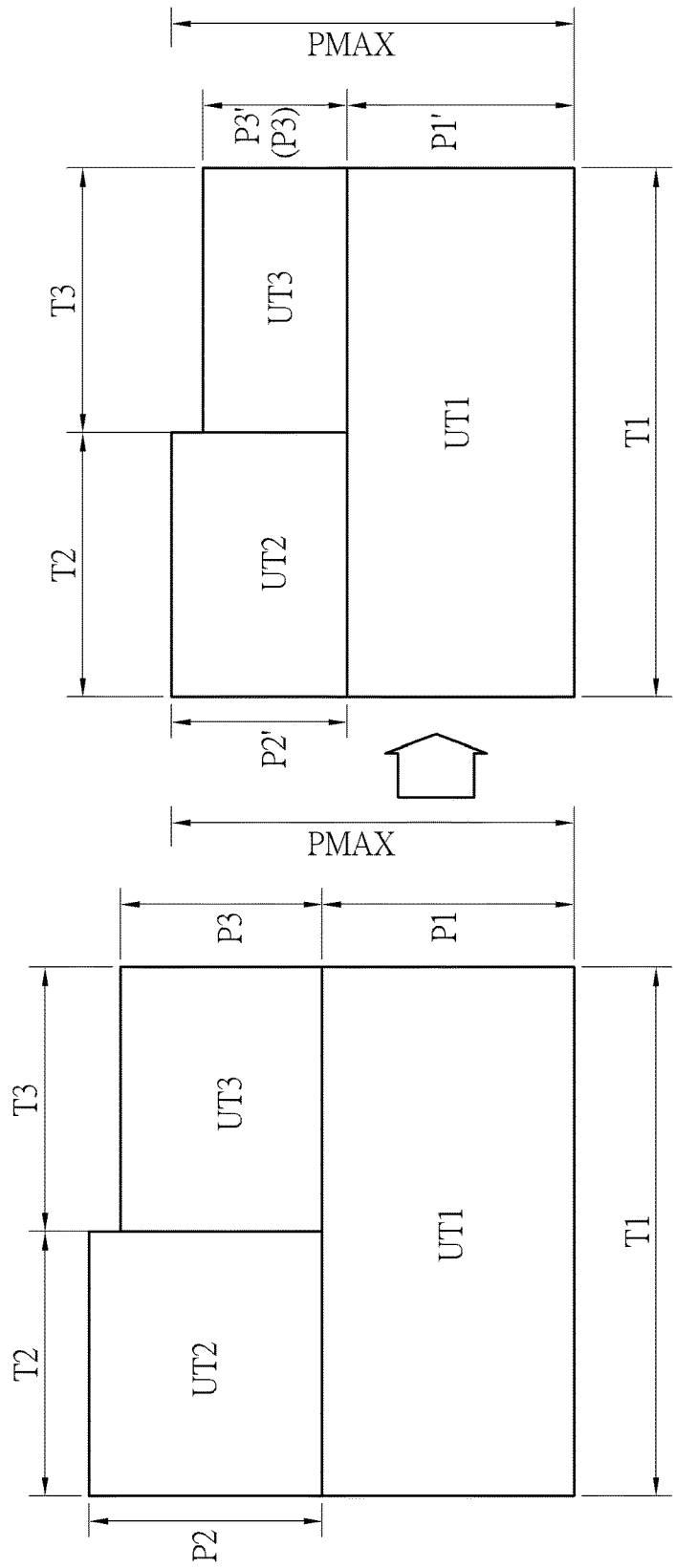
FIG. 4 is a schematic diagram of determination of power levels according to an example of the present invention.

FIG. 4 is a schematic diagram of determination of power levels according to an example of the present invention. Three UL transmissions UT1-UT3 with scheduled power levels P1-P3 are considered, wherein the scheduled power level P2 is greater than the scheduled power level P3. For example, the UL transmission UT1 includes a PUSCH, and the UL transmissions UT2-UT3 include PUSCH(s) and/or PUCCH(s). The UL transmissions UT1-UT3 are performed in time intervals T1-T3, respectively. In the present invention, a power level limit PMAX should be satisfied, e.g., sums of corresponding power levels are not greater than the power level limit PMAX. Power levels determined (e.g., adjusted, reduced) according to the present invention for the scheduled power levels P1-P3 are denoted as P1'-P3', respectively.

An example regarding use of a weight w for determining the power levels P1'-P3' is illustrated as follows. The power levels P1' and P2' are first determined since the power level P2 is greater than the power level P3. The power levels P1' and P2' may be determined according to the equation: $w(P1+P2) \leq PMAX$, where $P1'=w \cdot P1$ and $P2'=w \cdot P2$ (i.e., equal power reduction). Then, the power level P3' may be determined according the equation: $P3'=w \cdot P3$, $P3'=\min(w \cdot P2, P3)$ or $w1 \cdot P3 \leq PMAX-P1'$, e.g., if a sum of the power level P1' and the scheduled power level P3 is greater than the power level limit PMAX.

An example regarding use of the numbers of UL transmissions for determining the power levels P1'-P3' is illustrated as follows. The power levels P1' and P2' may be determined according to the equation: $P1'=P1-w2(P1+P2-PMAX)$ and $P2'=P2-w1(P1+P2-PMAX)$, where $w1=k1/(k1+k2)$ and $w2=k2/(k1+k2)$. k1 (e.g., 1) is the number of scheduled UL transmissions for the time interval T1, and k2 (e.g., 2) is the number of scheduled UL transmissions for the time intervals T2-T3. Then, the power level P3' may be determined according the equation: $P3'=P3-w1(P1+P2-PMAX)$. Alternatively, the power level P3' may be determined according the equation: $P3'=\min(P2',P3)$, e.g., if the sum of the power level P1' and the scheduled power level P3 is greater than the power level limit PMAX.

An example regarding use of the maximum numbers of schedulable UL transmissions for determining the power levels P1'-P3' is illustrated as follows. The power levels P1' and P2' may be determined according to the equation: $P1'=P1-w2(P1+P2-PMAX)$ and $P2'=P2-w1(P1+P2-PMAX)$, where $w1=k1/(k1+k2)$ and $w2=k2/(k1+k2)$. k1 (e.g., 1) is the maximum number of schedulable UL transmissions for the time interval T1, and k2 (e.g., 2) is the maximum number of schedulable UL transmissions for the time intervals T2-T3. Then, the power level P3' may be determined according the equation: $P3'=P3-w1(P1+P2-PMAX)$. Alternatively, the power level P3' may be determined according the equation: $P3' =\min(P2',P3)$, e.g., if the sum of the power level P1' and the scheduled power level P3 is greater than the power level limit PMAX.

An example regarding use of lengths of the time interval T1-T3 for determining the power levels P1'-P3' is illustrated as follows. The power levels P1' and P2' may be determined according to the equation: $P1'=P1-w1(P1+P2-PMAX)$ and $P2'=P2-w2(P1+P2-PMAX)$, where $w1=k1/(k1+k2)$ and $w2=k2/(k1+k2)$. k1 is a length of the time interval T1, and k2 is a length of the time interval T2. Then, the power level P3' may be determined according the equation: $P3'=P3-w2(P1+P2-PMAX)$. Alternatively, the power level P3' may be determined according the equation: $P3'=\min(P2',P3)$, e.g., if the sum of the power level P1' and the scheduled power level P3 is greater than the power level limit PMAX.

In the above examples, the communication device may use the scheduled power level P3 as the power level P3', if the sum of the power level P1' and the scheduled power level P3 is not greater than the power level limit PMAX. Thus, the communication device can perform the at least one UL transmissions UT1-UT3 regularly with the network according the power levels P1'-P3', respectively. In addition, the equations in the above four examples are only for illustration purpose. Those skilled in the art may exchange the equations in different examples. For example, the equations in the third example, may be applied to the fourth example, and the equations in the fourth example may be applied to the second example and the third example.

Figure 5:
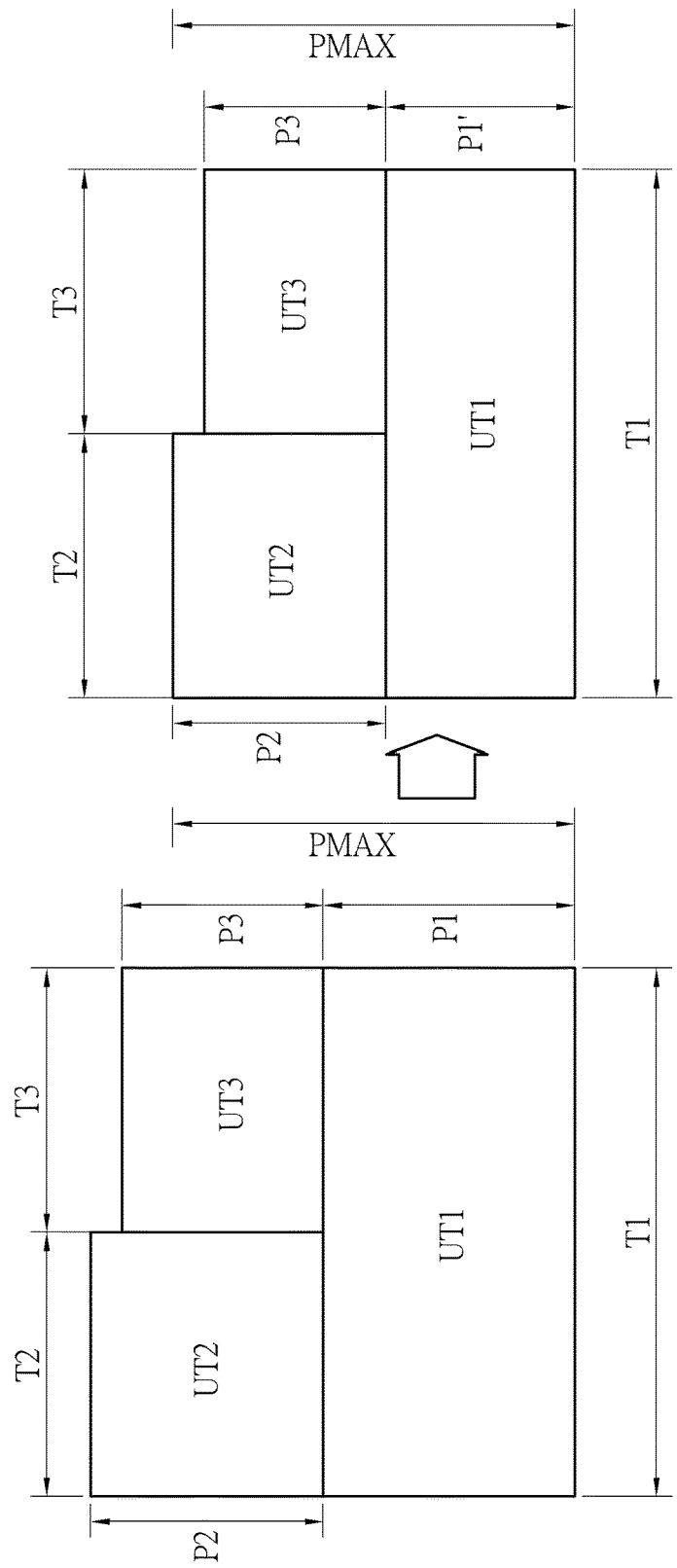
FIG. 5 is a schematic diagram of determination of power levels according to an example of the present invention.

FIG. 5 is a schematic diagram of determination of power levels according to an example of the present invention. Three UL transmissions UT1-UT3 with scheduled power levels P1-P3 are considered, wherein the scheduled power level P2 is greater than the scheduled power level P3. For example, the UL transmission UT1 includes a PUSCH, and the UL transmissions UT2-UT3 include PUSCH(s) and/or PUCCH(s). The UL transmissions UT1-UT3 are performed in time intervals T1-T3, respectively. In the present invention, a power level limit PMAX should be satisfied, e.g., sums of corresponding power levels are not greater than the power level limit PMAX. A power level determined (e.g., adjusted, reduced) according to the present invention for the scheduled power level P1 is denoted as P1'. In the present example, priorities of the time intervals T2-T3 are higher than a priority of the time interval T1. Accordingly, the scheduled power level P1 is first reduced according to the power level limit PMAX. The power level P1' may be determined according to the equation: $w \cdot P1 \leq PMAX-\max(P2,P3)$. Note that P1'=0 (i.e., the UL transmission UT1 is dropped) may happen if needed.

In the present example, a length of the time interval T2 and a length of the time interval T3 may or may not be less than a predetermined value, or may be preconfigured in the communication device. A number of scheduled UL transmissions for the time intervals T2-T3 (i.e., 2) may not be less than a predetermined value, or may be preconfigured in the communication device. Thus, the communication device can perform the UL transmissions UT1-UT3 regularly with the network according the power levels P1'-P3', respectively.

Figure 6:
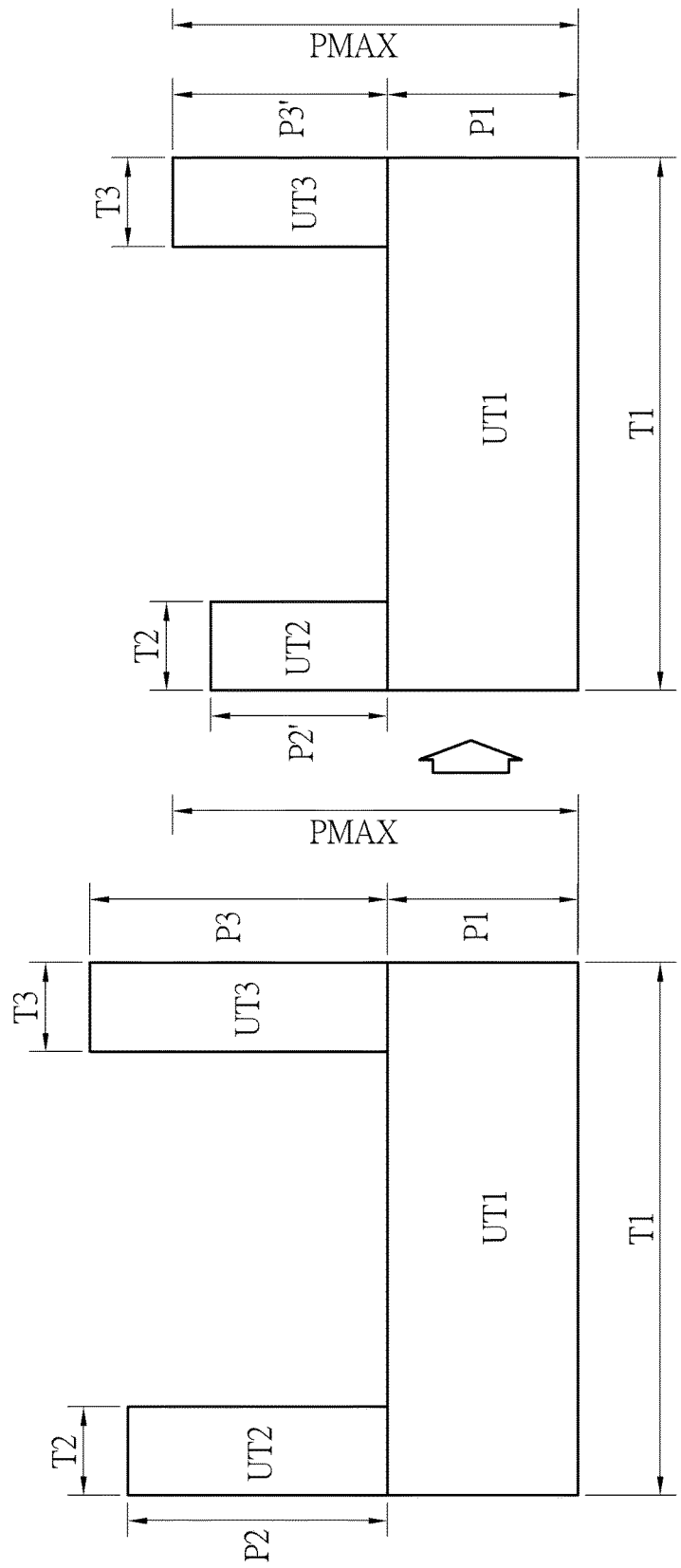
FIG. 6 is a schematic diagram of determination of power levels according to an example of the present invention.

FIG. 6 is a schematic diagram of determination of power levels according to an example of the present invention. Three UL transmissions UT1-UT3 with scheduled power levels P1-P3 are considered, wherein the scheduled power level P2 is greater than the scheduled power level P3. For example, the UL transmission UT1 includes a PUSCH, a PUCCH and/or a PRACH, and the UL transmissions UT2-UT3 include PUSCH(s) and/or PUCCH(s). The UL transmissions UT1-UT3 are performed in time intervals T1-T3, respectively. In the present invention, a power level limit PMAX should be satisfied, e.g., sums of corresponding power levels are not greater than the power level limit PMAX. Power levels determined (e.g., reduced) according to the present invention for the scheduled power levels P2-P3 is denoted as P2'-P3', respectively. In the present example, priorities of the time intervals T2-T3 are lower than a priority of the time interval T1. Accordingly, the scheduled power levels P2-P3 is reduced according to the power level limit PMAX. The power levels P2'-P3' may be determined according to the equations: $w1 \cdot P2 \leq PMAX-P1$ and $w2 \cdot P3 \leq PMAX-P1$. Note that P2'=P3'=0 (i.e., the at least one UL transmission UT2 and the at least one UL transmission UT3 are dropped) may happen if needed.

In the present example, a length of the time interval T2 and a length of the time interval T3 may or may not be less than a predetermined value, or may be preconfigured in the communication device. A number of scheduled UL transmissions for the time interval T2-T3 (i.e., 2) may be less than a predetermined value, or may be preconfigured in the communication device. Thus, the communication device can perform the UL transmissions UT1-UT3 regularly with the network according the power levels P1'-P3', respectively.

Figure 7:
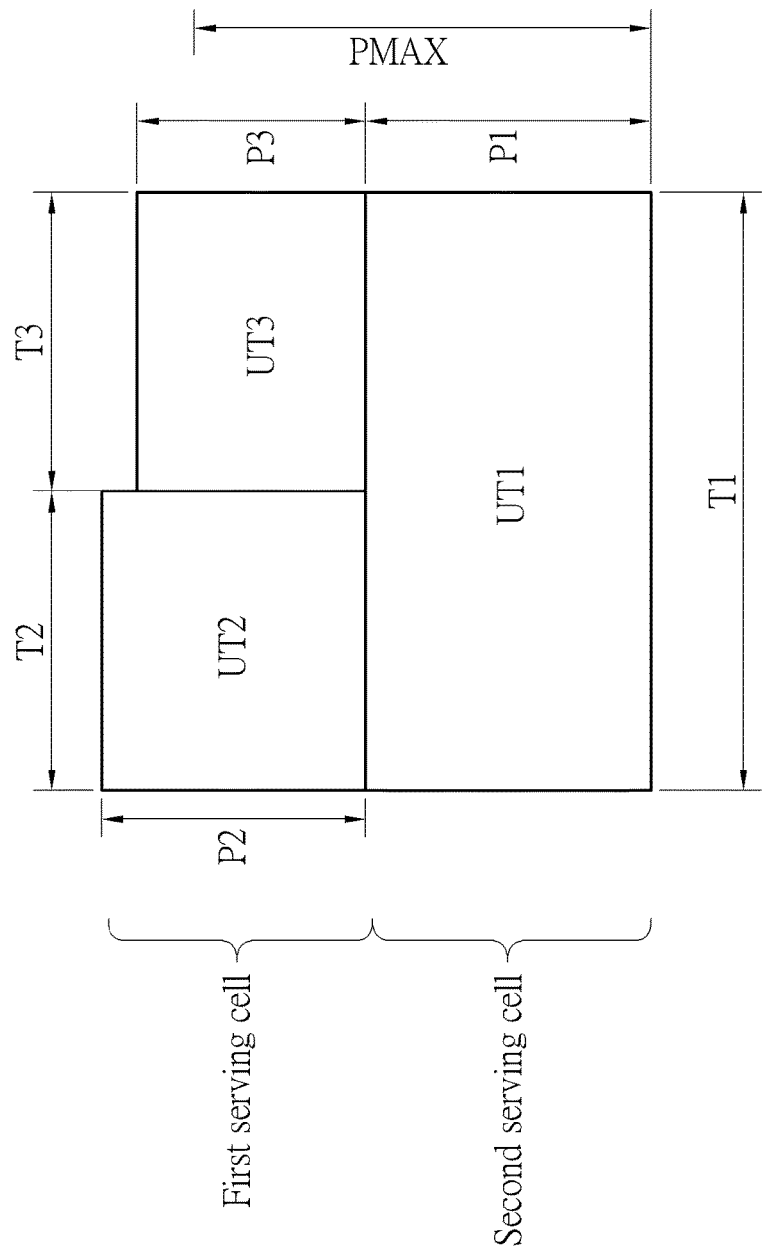
FIG. 7 is a schematic diagram of determination of power levels according to an example of the present invention.

FIG. 7 is a schematic diagram of determination of power levels according to an example of the present invention. Three UL transmissions UT1-UT3 with scheduled power levels P1-P3 are considered. For example, the UL transmission UT1 includes a PUSCH, and the UL transmissions UT2-UT3 include PUSCH(s) and/or PUCCH(s). The UL transmissions UT1-UT3 are performed in time intervals T1-T3, respectively. In the present invention, a power level limit PMAX should be satisfied, e.g., sums of corresponding power levels are not greater than the power level limit PMAX.

However, the communication device may not expect to perform a plurality of UL transmissions (e.g., PUSCH(s) and/or PUCCH(s)) within the same time interval. The plurality of UL channels may be configured to be transmitted in more than one time intervals. In one example, for the time interval T1, the communication device may not expect to transmit the UL transmissions UT2-UT3 to a first serving cell and to transmit the UL transmission UT1 to a second serving cell, wherein the above UL channels may be configured to transmitted with different power levels and/or via resource blocks with different sizes. In a first case, the communication device may perform all the UL transmissions UT2-UT3, if the scheduled power levels P2-P3 are the same.

In a second case, the communication device may perform only the UL transmission UT1 and one of the UL transmissions UT2-UT3, while the other one of the UL transmissions UT2-UT3 is not performed. The one of the UL transmissions UT2-UT3 may be selected based on that a lower power limitation impact is caused or no power limitation impact is caused. In one example, the one of the UL transmissions UT2-UT3 may be selected based on whether UL control information (UCI) is included in the UL transmissions UT2-UT3. In this case, the one of the UL transmissions UT2-UT3 may be the UL transmission with the UCI and the other one of the UL transmissions UT2-UT3 may be the UL transmission without the UCI. In one example, the one of the UL transmissions UT2-UT3 may be selected based on a schedule order (e.g., which one is scheduled first) and/or a transmission order (e.g., which one is scheduled to be transmit first). In this case, as shown in FIG. 7, the one of the UL transmissions UT2-UT3 may be the UL transmission UT2 and the other one of the UL transmissions UT2-UT3 may be the UL transmission UT3, if the transmission order is considered.

Figure 8:
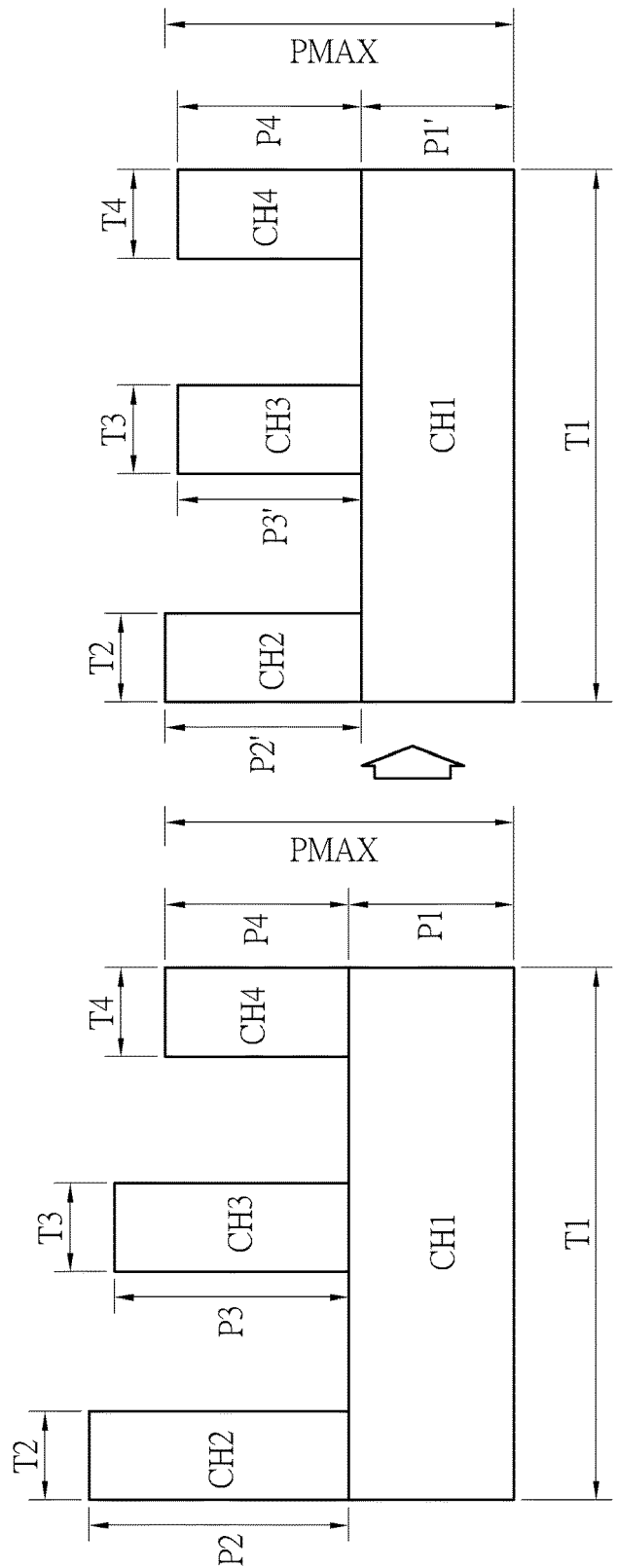
FIG. 8 is a schematic diagram of determination of power levels according to an example of the present invention.

FIG. 8 is a schematic diagram of determination of power levels according to an example of the present invention. Three PUSCHs CH1-CH3 and one PUCCH CH4 with scheduled power levels P1-P4 are considered. The PUSCHs CH1-CH3 and the PUCCH CH4 are performed in time intervals T1-T4, respectively. In the present invention, a power level limit PMAX should be satisfied, e.g., sums of corresponding power levels are not greater than the power level limit PMAX. Power levels determined (e.g., reduced) according to the present invention for the scheduled power levels P1-P3 is denoted as P1'-P3', respectively.

In one example, priorities of the PUSCHs CH1-CH3 are lower than a priority of the PUCCH CH4. Accordingly, the scheduled power levels P1-P3 may be first reduced to power levels $P1'=w1 \cdot P1$, $P2'=w2 \cdot P2$ and $P3'=w3 \cdot P3$, respectively, e.g., according to the previously mentioned examples. It should be noted that w1=w2=w3 may happen. Then, the power level P1' may be further reduced, if a sum of the power level P1' and the scheduled power level P4 is greater than the power level limit PMAX. Thus, the communication device can perform The PUSCHs CH1-CH3 and the PUCCH CH4 regularly with the network according the power levels P1'-P3' and the scheduled power level P4, respectively.

In one example, the scheduled power levels P1 may be first reduced to a power level P1' according to the equation $w1 \cdot P1 \leq PMAX-P4$. Then, the power levels P2'-P3' may be determined according to the previously mentioned examples, such that corresponding sums of the power level P1' and the power levels P2'-P3' are not greater than the power level limit PMAX. Thus, the communication device can perform The PUSCHs CH1-CH3 and the PUCCH CH4 regularly with the network according the power levels P1'-P3' and the scheduled power level P4, respectively.

In the above examples, min (x, y) returns the minimum of x and y, and max (x, y) returns the maximum of x and y. Determining a power level may mean reducing the power level or maintaining the power level (e.g., at a scheduled power level). A power level may mean transmission power or power related to a communication operation. A scheduled power level for a UL transmission may be any power level obtained prior the execution of the process 30, For example, the scheduled power level maybe a power level scheduled (e.g., indicated) by the network, may be a power level predetermined in (e.g., calculated by) the communication device, and is not limited herein.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium.

The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a device and method for handling power control for multiple time intervals. Thus, a communication device can perform UL transmissions in the time intervals according to properly determined power levels. As a result, the UL transmissions are performed without being dropped or lost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling power control for multiple time intervals, comprising:
   a storage device, for storing instructions of:
   determining a first power level for a first uplink (UL) transmission, a second power level for a second UL transmission and at least one third power level for at least one third UL transmission such that a sum of the first power level and the second power level is not greater than a power level limit of the communication device and at least one corresponding sum of the first power level and the at least one third power level is not greater than the power level limit;
   performing the first UL transmission with the first power level in a first time interval to a network;
   performing the second UL transmission with the second power level in a second time interval in the first time interval to the network; and
   performing the at least one third UL transmission with the at least one third power level in at least one third time interval in the first time interval to the network, wherein the second time interval and the at least one third time interval are not overlapped; and
   a processing circuit, coupled to the storage device, configured to execute the instructions stored in the storage device.

2. The communication device of claim 1, wherein the instruction of determining the first power level, the second power level and the at least one third power level comprises:
   adjusting a first scheduled power level for the first UL transmission to the first power level and a second scheduled power level for the second UL transmission to the second power level according to the power level limit and a weight for the first scheduled power level and the second scheduled power level, wherein the second scheduled power level is greater than at least one third scheduled power level for the at least one third UL transmission; and
   adjusting the at least one third scheduled power level to the at least one third power level according to the power level limit and the first power level, if at least one corresponding sum of the first power level and the at least one third scheduled power level is greater than the power level limit.

3. The communication device of claim 1, wherein the instruction of determining the first power level, the second power level and the at least one third power level comprises:
   adjusting a first scheduled power level for the first UL transmission to the first power level and a second scheduled power level for the second UL transmission to the second power level according to the power level limit and a number of scheduled UL transmissions for the second time interval and the at least one third time interval, wherein the second scheduled power level is greater than at least one third scheduled power level for the at least one third UL transmission; and
   adjusting the at least one third scheduled power level to the at least one third power level according to the power level limit and the first power level, if at least one corresponding sum of the first power level and the at least one third scheduled power level is greater than the power level limit.

4. The communication device of claim 1, wherein the instruction of determining the first power level, the second power level and the at least one third power level comprises:
   adjusting a first scheduled power level for the first UL transmission to the first power level and a second scheduled power level for the second UL transmission to the second power level according to the power level limit and a maximum number of schedulable UL transmissions for the second time interval and the at least one third time interval, wherein the second scheduled power level is greater than at least one third scheduled power level for the at least one third UL transmission; and
   adjusting the at least one third scheduled power level to the at least one third power level according to the power level limit and the first power level, if at least one corresponding sum of the first power level and the at least one third scheduled power level is greater than the power level limit.

5. The communication device of claim 1, wherein the instruction of determining the first power level, the second power level and the at least one third power level comprises:
   adjusting a first scheduled power level for the first UL transmission to the first power level and a second scheduled power level for the second UL transmission to the second power level according to the power level limit, a length of the first time interval and a length of the second time interval, wherein the second scheduled power level is greater than a third scheduled power level for the at least one third UL transmission; and
   adjusting the at least one third scheduled power level to the at least one third power level according to the power level limit and the first power level, if at least one corresponding sum of the first power level and the at least one third scheduled power level is greater than the power level limit.

6. The communication device of claim 1, wherein the instruction of determining the first power level, the second power level and the at least one third power level comprises:

adjusting a first scheduled power level for the first UL transmission to the first power level according to the power level limit and a maximum of a second scheduled power level for the second UL transmission and at least one third scheduled power level for the at least one third UL transmission;

configuring the second power level to be the second scheduled power level; and configuring the at least one third power level to be the at least one third scheduled power level.

7. The communication device of claim 1, wherein at least one grant for the at least one third UL transmission is received, after a grant for the first UL transmission is received.

8. The communication device of claim 1, wherein the at least one third UL transmission is performed, after the first UL transmission is performed.

9. The communication device of claim 1, wherein the instruction of determining the first power level, the second power level and the at least one third power level comprises:

configuring the first power level to be a first scheduled power level for the first UL transmission;

adjusting a second scheduled power level for the second UL transmission to the second power level according to the power level limit and the first power level; and adjusting at least one third scheduled power level for the at least one third UL transmission to the at least one third power level according to the power level limit and the first power level.

10. The communication device of claim 1, wherein the instruction of determining the first power level, the second power level and the at least one third power level comprises:

adjusting at least one third scheduled power level for the at least one third UL transmission to the at least one third power level according to the power level limit and the first power level.

11. The communication device of claim 1, wherein the instruction of determining the first power level, the second power level and the at least one third power level comprises:

dropping the second UL transmission or the at least one third UL transmission.

12. The communication device of claim 11, wherein a scheduled power level for the second UL transmission and at least one scheduled power level for the at least one third UL transmission are different.

13. The communication device of claim 1, wherein a scheduled power level for the second UL transmission and at least one scheduled power level for the at least one third UL transmission are the same.

14. The communication device of claim 1, wherein the second power level is approximately zero, and performing the second UL transmission comprises dropping the second UL transmission.

15. The communication device of claim 1, wherein the at least one third power level is approximately zero, and performing the at least one third UL transmission comprises dropping the at least one third UL transmission.

16. The communication device of claim 1, wherein the first power level is approximately zero, and performing the first UL transmission comprises dropping the first UL transmission.

17. The communication device of claim 1, wherein the first UL transmission is performed to a first cell of the network, and the second UL transmission and the at least one third UL transmission are performed to a second cell of the network.

18. The communication device of claim 1, wherein the first UL transmission is performed via a first radio access technology (RAT), and the second UL transmission and the at least one third UL transmission are performed via a second RAT.

19. The communication device of claim 1, wherein the second UL transmission comprises a physical UL shared channel (PUSCH), and the at least one third UL transmission comprises at least one physical UL control channel (PUCCH).

20. The communication device of claim 19, wherein the at least one third power level is determined to be at least one scheduled power level for the at least one third UL transmission.

21. The communication device of claim 1, wherein the second UL transmission comprises a PUSCH, and the at least one third UL transmission comprises at least one PUSCH.

22. The communication device of claim 1, wherein the first UL transmission comprises a PUSCH, a PUCCH, or a physical random access channel (PRACH).

23. The communication device of claim 1, wherein the at least one third time interval is after the second time interval.

24. The communication device of claim 1, wherein a length of the second time interval and a length of each of the at least one third time interval are the same.

25. The communication device of claim 1, wherein a length of the second time interval and a length of each of the at least one third time interval are not greater than a half length of the first time interval.

* * * * *

UNITED STATES PATENT AND TRADEMARK OFFICE
CERTIFICATE OF CORRECTION

PATENT NO.         : 10,356,724 B2
APPLICATION NO.    : 15/659636
DATED              : July 16, 2019
INVENTOR(S)        : Chien-Min Lee Page 1 of 1

It is certified that error appears in the above-identified patent and that said Letters Patent is hereby corrected as shown below:

On the Title Page

Item (54) and in the Specification, at Column 1, Line 1-3, correct the title of invention from "DEVICE HANDLING POWER CONTROL FOR TIME INTERVALS BASED ON POWER LEVEL LIMIT" to --DEVICE OF HANDLING POWER CONTROL FOR TIME INTERVALS BASED ON POWER LEVEL LIMIT--.

Signed and Sealed this
Third Day of September, 2019

Andrei Iancu
*Director of the United States Patent and Trademark Office*